United States Patent Office 3,647,835
Patented Mar. 7, 1972

3,647,835
METHOD OF DIRECT GENERATION OF MANGANESE (III) SOLUTION FROM MANGANESE (II) SOLUTION
Stephen A. Butter, Bound Brook, N.J., assignor to Mobil Oil Corporation
No Drawing. Filed Nov. 12, 1969, Ser. No. 876,136
Int. Cl. C07c 11/26; C07d 103/00
U.S. Cl. 260—429 R                       11 Claims

ABSTRACT OF THE DISCLOSURE

A method in which an aqueous manganese (II) solution is treated with a tertiary amine or ammonia in a free oxygen-containing atmosphere results in manganese (II) oxide or manganese (II) hydroxide precipitation which, in situ, is rapidly oxidized to manganese (III) oxide from which, upon treatment with a suitable acid, particularly an aliphatic carboxylic acid, the manganese (III) salt of said acid is obtained. The compounds are useful as catalysts for the synthesis of lactones from olefins.

CROSS-REFERENCE TO RELATED APPLICATIONS

Application Ser. No. 876,135, filed on the same date herewith, relates to a method for improved recovery of amine or ammonia components from adducts thereof with organic acids.

BACKGROUND OF THE INVENTION

Field of the invention

This invention relates to a method of generation of manganese (III) solution from manganese (II) solution. More particularly, it relates to a method of preparing manganese (III) solution from manganese (II) solution by treating an aqueous solution of manganese (II) with a tertiary amine or ammonia in a free oxygen-containing atmosphere.

Description of the prior art

The preparation of manganese (III) acetate by oxidizing reduced forms of manganese is usually accomplished by use of relatively expensive and strong oxidants such as potassium permanganate, peracetic acid, ozone, or hydroperoxides. Also, said preparation may be accomplished electrolytically. It is also known to those skilled in the art that manganese (II) may be precipitated by alkali or hydroxide bases as well as by nitrogen bases such as ammonia or N,N-dimethyl aniline and that the precipitate darkens in air through oxidation to manganese (III) (W. M. Latimer and J. H. Hildebrand, Reference Book of Inorganic Chemistry, MacMillen, 1951, p. 390, and Mellor, volume XII, A Comprehensive Treatise on Inorganic and Theoretical Chemistry, 1932, p. 226).

SUMMARY OF THE INVENTION

In accordance with this invention, there is provided a method of generation of manganese (III) solution by oxidation of manganese (II) solution with a tertiary amine or ammonia in a free oxygen-containing atmosphere (e.g., air or oxygen gas). This method results in manganese (II) oxide or manganese (II) hydroxide precipitation which, in situ, is rapidly oxidized to manganese (III) oxide from which, upon treatment with a suitable acid, and particularly an organic acid, e.g., an aliphatic carboxylic acid, the manganese (III) salt of said acid is obtained.

DESCRIPTION OF SPECIFIC EMBODIMENTS

As will be noted, this invention eliminates the need for strong and expensive oxidants commonly used in prior art method of generation of manganese (III) which are required to overcome the high Mn(II)-Mn(III) redox potential of about 1.5 volts in acidic media. Also, it permits the direct generation of manganese (III) salt with the use of a free oxygen-containing atmosphere such as air or oxygen gas. As set forth herein. this is accomplished by using a basic media where the Mn(II)-Mn(III) redox potential is greatly reduced. Since the manganese (III) ion is somewhat unstable in non-acid solution, the present invention provides a process which stabilizes said ion by reducing its stability and allowing precipitation of the oxidized solid which is stirred with an organic acid, particularly an aliphatic carboxylic acid, to generate the manganese (III) salt of said acid.

Also in the present invention, wherein a weak amine is used, the reaction products comprise manganese (II) hydroxide or oxide and a complex of the amine with the acid of the manganese (II) salt. The complex formed is such that both the amine and acid are easily recoverable therefrom and may be reused.

As compared to the use of a strong alkali, as for example sodium hydroxide, in place of the amine as embodied herein, a strong acid is required to free the organic acid from the sodium salt (e.g., sodium acetate) that is formed and, additionally, the by-product sodium chloride is formed.

In the present process, using the amine rather than a strong alkali, the amine is recoverable from the complex with the acid in a form reusable in the process, thereby eliminating the need for discard or conversion of a by-product (as in the case of sodium chloride) when sodium hydroxide is used.

The organic acid used in this invention for the generation of the manganese (III) salt is preferably an aliphatic carboxylic acid, and more specifically, a lower molecular weight fatty acid of from 2 to 12 carbon atoms. Acetic acid is commonly used as the organic acid in generating the manganese (III) salt (i.e., manganese (III) acetate), especially when the manganese (III) solution is to be used in reactions utilizing acetic acid as the reaction solvent or as a reactant.

The method of this invention for generation or manganese (III) is valuable for use in combination with many reactions, especially where manganese (III) (e.g., acetate) is used such as in the oxidation synthesis of lactones from olefins and fatty acids. Such reactions are disclosed in pending U.S. application Ser. No. 714,447, filed Mar. 20, 1968 now abandoned, wherein, the specific embodiment, an olefin in acetic acid is contacted with a free oxygen-containing gas in the presence of manganese (III) acetate to produce a lactone. The manganese (III) is converted in said reaction to manganese (II) and, in a continuous process, the resulting solution of manganese (II) as a salt (e.g., acetate) in aqueous solution is treated in accordance with this invention to provide a manganese (III) acetate solution for recycle to the oxidation reaction.

In the reaction of this invention, and although it can be carried out with the use of the amine or ammonia in an amount less than stoichiometric (stoichiometry is two moles of amine or ammonia per mole of manganese (II) salt), as, for example, 50% or more of stoichiometric, the amine or ammonia is preferably used in an amount at least equivalent to stoichiometric, and, more preferably, in excess of from about 10 to 50% or more over stoichiometric. If the amine or ammonia is present in an amount less than stoichiometric, lower yields are generally obtained. The concentration of manganese (II) solutions used for the generation are usually from about 0.02 to about 2 molar in manganese with a preferred range of from about 0.1 to about 1.0 molar.

Since high temperatures will tend to decrease the yield of manganese (III) by enhancing its decomposition, the method of this invention is preferably carried out at a temperature below the temperature of substantial decomposition of manganese (III), and more preferably at room temperature (i.e., about 20°–30° C.). A temperature in the range of from about 10° to about 80° C. is usually suitable for practice of this invention.

The amines used in the method of this invention are preferably trialkyl amines, and more specifically, trialkyl amines containing from 3 to about 12 carbon atoms. Triethylamine and trimethylamine are preferred since these amines are more readily recoverable from their amine-acid azeotropes. Non-limiting examples of the amines embodied for use in the method of this invention include: triethylamine; trimethylamine; triethylene diamine; tributylamine; and N,N-dimethyl aniline. Ammonia may also be effectively utilized.

In example of a specific embodiment of this invention, a small excess of a tertiary amine is added to an aqueous manganese (II) solution. The solution is stirred in an air or oxygen atmosphere at room temperature. A precipitation of manganese (II) oxide or hydroxide is rapidly oxidized, in situ, to manganese (III) oxide or hydroxide which is collected by centrifugation, filtration, or other suitable means. It is then dissolved and crystallized from an organic acid, especially an aliphatic carboxylic acid, to yield the manganese (III) salt of said acid. Illustrated by use of acetic acid as the organic acid, the overall summation of reactions indicating the generation of the manganese (III) salt is:

$$Mn(OAc)_2 + \tfrac{1}{4} O_2 + HOAc \rightarrow Mn(OAc)_3 + \tfrac{1}{2} H_2O$$

The method of this invention is depicted in the following specific examples of generation of manganese (III) from manganese (II).

EXAMPLE 1

A one liter flask containing 89.4 grams $Mn(OAc)_2 \cdot 4H_2O$ in 0.5 liter water was vigorously stirred in an atmosphere of oxygen. 153.1 ml. triethylamine was slowly added and the mixture was stirred one hour longer. The precipitated solids were centrifuged, washed with 400 ml. water and stirred overnight with 600 ml. acetic acid. Excess acetic acid was separated by centrifugation and the $Mn(OAc)_3 \cdot 2H_2O$ product was dried overnight in a vacuum oven at 50° C. The yield was 84.0 grams (86% of theory).

EXAMPLE 2

A glass tube (13 in. length, 2 in. diameter) with a fritted disc at the bottom was charged with 3.58 grams $Mn(OAc)_2 \cdot 4 H_2O$ and 20 ml. water. While oxygen was passed through the disc from below, 2.95 grams triethylamine was dropped into the solution. After 15 minutes, the conversion to manganese (III) was estimated by iodometric titration to be 71.2%.

EXAMPLE 3

A glass tube (8 in. length, 1 in. diameter) with fritted disc at the bottom was charged with 0.49 gram

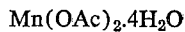

$Mn(OAc)_2 \cdot 4H_2O$ in .01 liter water. Air was passed through the bottom of the disc while 0.7 ml. triethylamine was added at the top of the tube. After five minutes at room temperature, the yield of manganese (III) was 78% estimated by visible spectrometry or iodometric titration (after acidification).

EXAMPLE 4

Under the identical conditions of Example 3, but with air replaced by oxygen, the yield of manganese (III) was 93.4%.

EXAMPLE 5

A 250 ml. creased flask was charged with 5 grams $Mn(OAc)_2 \cdot 4H_2O$ in 50 ml. water. In an atmosphere of oxygen, 18.8 ml. of a 25% aqueous trimethylamine solution was added. The mixture was stirred for 0.5 hour. An 89.8% conversion to manganese (III) was found.

EXAMPLE 6

Under the identical conditions of Example 5, but using 11.8 ml. of trimethylamine solution instead of 18.8 ml., conversion to manganese (III) was 62.3%.

Although the present invention has been described with specific examples, it is to be understood that modifications and variations may be resorted to, without departing from the spirit and scope of the invention, as those skilled in the art will readily understand.

What is claimed is:

1. A method of producing in high yield a manganese (III) salt of a fatty acid from a solution of a manganese (II) compound which comprises contacting with a tertiary alkylamine of 3–12 carbon atoms an aqueous solution containing a manganese (II) salt of a lower molecular weight fatty acid in the presence of a free oxygen-containing gas to in situ convert said manganese (II) salt of said fatty acid to a compound of manganese (III) insoluble in said solution, separating said insoluble compound from said solution, and reacting said manganese (III) compound with a lower molecular weight fatty acid of 2–12 carbon atoms to convert said manganese (III) compound to a stable manganese (III) salt of said fatty acid.

2. A method as defined in claim 1, wherein the amine is used in an amount at least stoichiometrically equivalent to said manganese (II).

3. A method as defined in claim 1, wherein said free oxygen-containing gas is air or oxygen.

4. A method as defined in claim 3, wherein the trialkylamine is triethylamine or trimethylamine.

5. A method as defined in claim 1, wherein said manganese (II) solution is an aqueous solution of manganese (II) acetate.

6. A method as defined in claim 1, wherein said amine is used in an amount from about 10 to about 50% in excess of the amount stoichiometrically equivalent to said manganese (II).

7. A method as defined in claim 1, wherein the molar concentration of said solution of manganese (II) is from about 0.02 to about 2.

8. A method as defined in claim 1 wherein the molar concentration of said solution of manganese (II) is from about 0.1 to about 1.

9. A method as defined in claim 1, wherein said amine is used in an amount from about 10 to about 50% in excess of the amount stoichiometrically equivalent to said manganese (II), and the molar concentration of said solution of manganese (II) is from about 0.02 to about 2.

10. A method as defined in claim 1, wherein said manganese (II) is in aqueous solution in the form of manganese (II) acetate, the free oxygen-containing gas is oxygen, the amine is present in an amount at least stoichiometrically equivalent to the manganese (II), and the contacting of the solution containing the manganese (II) is carried out at a temperature below the decomposition temperature of manganese (III) oxide.

11. A method as defined in claim 1, wherein said manganese (II) compound is manganese (II) acetate, said tertiary alkylamine is trimethylamine or triethylamine present in an amount at least stoichiometrically equivalent to the manganese (II), said free oxygen-containing gas is air or oxygen, said fatty acid is acetic acid, and the contacting of the solution containing the manganese (II) is carried out at a temperature below the decomposition temperature of manganese (III) oxide.

References Cited

Nichols et al.: J. Am. Chem. Soc. 64 (1942) pp. 1866–1870.

Noller: Chemistry of Organic Compounds, W. B. Saunders Co., Philadelphia, 3rd ed., 1966, pp. 258–9.

Kirk-Othmer: Encyclopedia of Chemical Technology, Interscience Publishers, New York, N.Y., vol. 13 (1966), pp. 7–8.

Sidgwick: Chemical Elements and Their Compounds, Oxford University Press, London, 1950, pp. 1274–6, 1282–4.

Moeller: Inorganic Chemistry, John Wiley and Sons, New York, 1952, p. 883.

TOBIAS E. LEVOW, Primary Examiner

A. P. DEMERS, Assistant Examiner

U.S. Cl. X.R.

260—343, 343.6